United States Patent
Cho

(10) Patent No.: US 6,377,800 B1
(45) Date of Patent: Apr. 23, 2002

(54) RESOURCE ASSIGNMENT METHOD ACCORDING TO THE DATA TRANSMISSION TYPES IN WIRELESS LOCAL LOOP SYSTEM

(75) Inventor: Yoo-jin Cho, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/391,740

(22) Filed: Sep. 8, 1999

(30) Foreign Application Priority Data

Sep. 8, 1998 (KR) ............................................. 98-36974

(51) Int. Cl.[7] ................................................ H04Q 7/20
(52) U.S. Cl. ........................ 455/426; 455/450; 370/335; 370/336
(58) Field of Search ................................. 455/426, 450, 455/509, 514, 554; 370/329, 328, 335, 336, 341, 342, 345

(56) References Cited

U.S. PATENT DOCUMENTS

| | | | | |
|---|---|---|---|---|
| 5,204,876 A | * | 4/1993 | Bruckert et al. ................ | 375/1 |
| 5,373,502 A | * | 12/1994 | Turban ......................... | 370/18 |
| 5,799,010 A | * | 8/1998 | Lomp et al. .................. | 370/335 |
| 5,857,147 A | * | 1/1999 | Gardner et al. ............... | 455/450 |
| 5,926,764 A | * | 7/1999 | Sarpola et al. ............... | 455/450 |
| 5,936,960 A | * | 8/1999 | Stewart ........................ | 370/438 |
| 6,172,968 B1 | * | 1/2001 | Rasanen ....................... | 455/450 |
| 6,212,174 B1 | * | 4/2001 | Lomp et al. .................. | 370/335 |
| 6,292,476 B1 | * | 9/2001 | Zehavi et al. ................. | 370/335 |

* cited by examiner

Primary Examiner—Edward F. Urban
(74) Attorney, Agent, or Firm—Steve Cha; Klauber & Jackson

(57) ABSTRACT

The present invention discloses a method for assigning resource allocation according to different data transmission rate in a wireless local loop (WLL) system, wherein a radio distribution unit (RDU) connects radio carrier station (RCSs) and a local exchange (LE) through a plurality of trunks having a plurality of time slots for exchanging call set-ups and information signals. The method includes the steps of requesting a call for data service to the RDU and transmitting information of the trunk on the requested call assigned by the RCS and the LE, confirming by the RDU whether the first sub-time slot of the first time slot of the assigned trunk and the first time slot are in idle state, requesting the RDU render data service if the first sub-time slot in the first time slot of the assigned trunk and the first time slot are in idle state, checking the data transmission rate of the requested call, reserving the idle sub-time slots according to the data transmission type, setting the remaining sub-time slots into a busy state, storing the set-up results for the sub-time slots, and after the data transmission, releasing the sub-time slot to further the data transmission by converting the sub-time slots that are previously set to busy state into an idle state.

20 Claims, 4 Drawing Sheets

1

RESOURCE ASSIGNMENT METHOD ACCORDING TO THE DATA TRANSMISSION TYPES IN WIRELESS LOCAL LOOP SYSTEM

CLAIM OF PRIORITY

This application makes reference to, incorporates the same herein, and claims all benefits accruing under 35 U.S.C. §119 arising from an application entitled, RESOURCE ASSIGNMENT METHOD ACCORDING TO THE DATA TRANSMISSION TYPES IN WIRELESS LOCAL LOOP SYSTEM, earlier filed in the Korean Industrial Property Office on Sep. 8, 1998, and there duly assigned Serial No. 1998-36974.

FIELD OF THE INVENTION

The present invention relates to a wireless local loop (WLL) system, and more particularly a method for allocating and releasing communication resources at different data transmission rates in a base station controller of the WLL system.

DESCRIPTION OF THE RELATED ART

The WLL system, using Wideband Code Division Multiple Access(CDMA) technology, allows a subscriber of a fixed telephone unit to be connected to a central office through radio links. The function of WLL system is basically the same as mobile communication system, except that it does not provide mobility for the fixed subscriber unit. In comparison to other system, the WLL system is considered to be more economical and faster in providing communication services, i.e., voice data and packet data via facsimile, internet service, etc.

FIG. 1 is a block diagram of WLL system according to prior art, which includes a plurality of telephones(10), a fixed subscriber unit (FSU)(20) coupled to the telephones, a plurality of radio carrier station(RCS)(30) coupled to the FSUs for providing radio links to both the FSU and the telephones, a radio distribution unit(RDU)(40) coupled to the RCSs which interfaces with a local exchange(LE)(50) through trunk links, and a public switched telephone network(PSTN)(60) for connecting the LE with other network.

Typically, the WLL system uses 64 kbps Pulse Code Modulation(PCM) data transmission for compacting the voice data, and 32 kbps Adaptive Differential PCM (ADPCM) data transmission, and 16 kbps Low Delay Code Excited linear Prediction(LD-CELP) data transmission for further improving the compression ratio of the voice data.

Since the rate of data transmission differs among various subscribers, the data received at the RDU through the trunk link tends to overlap with each other. That is, in the prior art, it is not possible to know which sub-time slot is being used for which transfer rate, causing error at the recovery stage.

SUMMARY OF THE INVENTION

One object of the present invention is to provide a method for allocating and releasing communication resources at different data transmission rates in the WLL system, by allocating time slots of trunk channels to accommodate different data transmission rate.

Other object of the present invention is to provide a method for allocating and releasing communication resources at different data transmission rates in the WLL system in order to increase the capacity of trunks to accommodate more subscribers and improve the recovery error, and the different data transmission rate includes 64 kbps PCM, 32 kbps ADPCM, and 16 kbps PCM.

Other objects and advantages of the present invention will become apparent with reference to the following detailed description and the attached drawings.

DETAILED DESCRIPTION OF THE INVENTION

Figure 1:
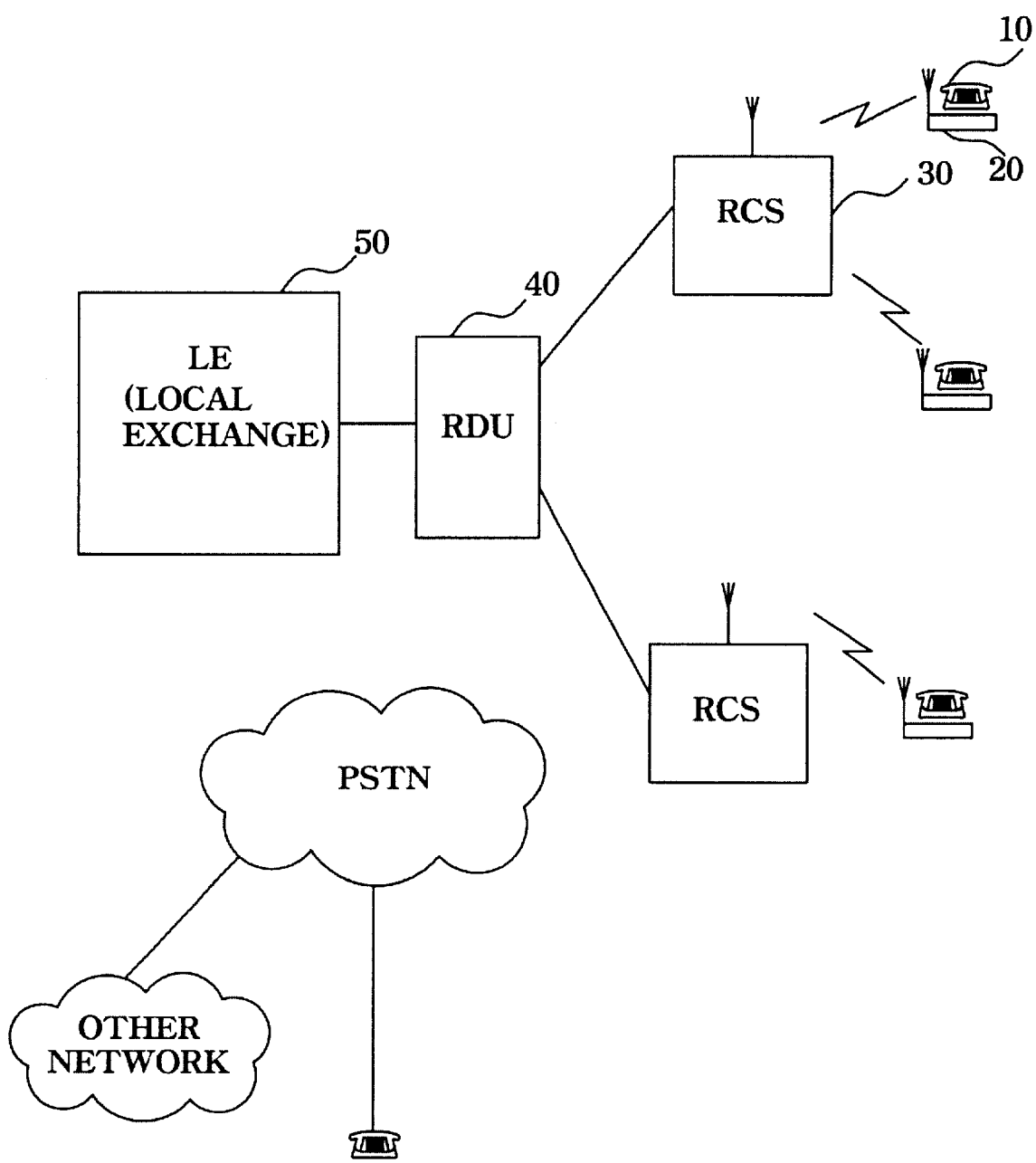
FIG. 1 is a block diagram of WLL system of the prior art.

As shown in FIG. 1, one or more radio carrier station (RCS) (30) connected to a radio distribution unit (RDU) (40) through a plurality of links, and RDU (40) interfaces with a local exchange (LE) (50) for exchanging call control and traffic channels. The RDU(40) assigns and releases resource allocation for generating and maintaining the calls. Accordingly, the present invention provides a method for assigning and releasing resource allocation according to the various data transmission rates at RDU (40).

The RDU (40) is connected with the LE (50) and FSU (20) and communicates with the RCSs (30) through telco links. The multiple trunks connecting the LE (50) and the RDU (40) can be up to 16 trunks at a maximum. Each trunk is composed of 32 time division channels (time slots), and each time slot transmits 8-bit data. Namely, one subscriber uses all of 8 bits in a time slot for the 64 kbps PCM data transmission type. The 32 kbps ADPCM data transmission type can process two subscribers in a time slot. That is, two subscribers use all of 8 bits in a time slot. The 16 kbps LD-CELP data transmission type can process four subscribers in a time slot, and thus, four subscribers use all of 8 bits in a time slot.

Each time-slot of 8 bits is divided into four sub-time slots and each sub-time slot is composed of 2 bits. Accordingly, the 64 kbps PCM occupy all four sub-time slots in a time-slot, the 32 kbps ADPCM occupy two of the four sub-time slots in a time-slot, and the 16 kbps LD-CELP data occupy only one of the four sub-time slots in a time-slot. Therefore, the location of sub-time slot is set up differently depending on the rate of data transmission through the trunk.

Figure 2:
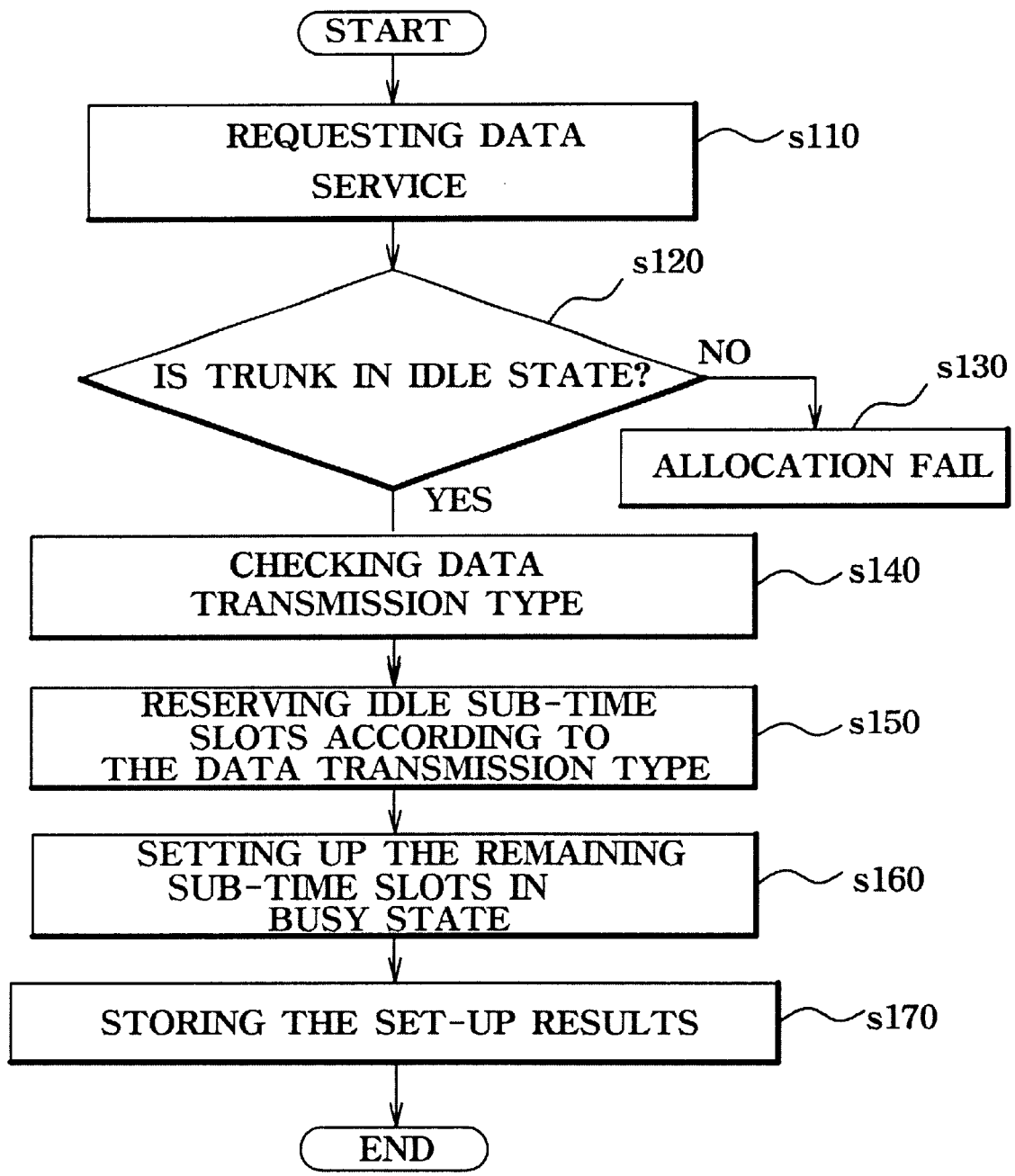
FIG. 2 is a flow chart of a resource assignment method of RDU of the present invention.

FIG. 2 illustrates a flow chart of a resource assignment method of RDU according to the present invention. In step (s110), the RCS and the LE request a call request signal for data transmission to the RDU (40). In the step (s120), the RDU searches a pre-stored Highway/look up table to determine whether the first sub-time slot is available or in idle state on a given time slot of the nth trunk, to which the call request is addressed by the RCS and the LE. If corresponding sub-time slots of the relevant time slot is not in idle state, in step (s130), the RDU determines that the resource allocation resulted in failure, and outputs an error message to notify the failure. That is, only the sub-time slots in idle state can be used for data transmission through a new resource allocation.

If the relevant sub-time slot is in idle state, in step (s140), the RDU checks for the data transmission rate of the requested call. When the subscriber interface shifts into the off-hook state, the RUD (40) is informed of the data transmission rate. In step (s150), the RDU (40) reserves the sub-time slot in idle mode for data transmission according to the data transmission rate determined in step (s140).

Figure 3:
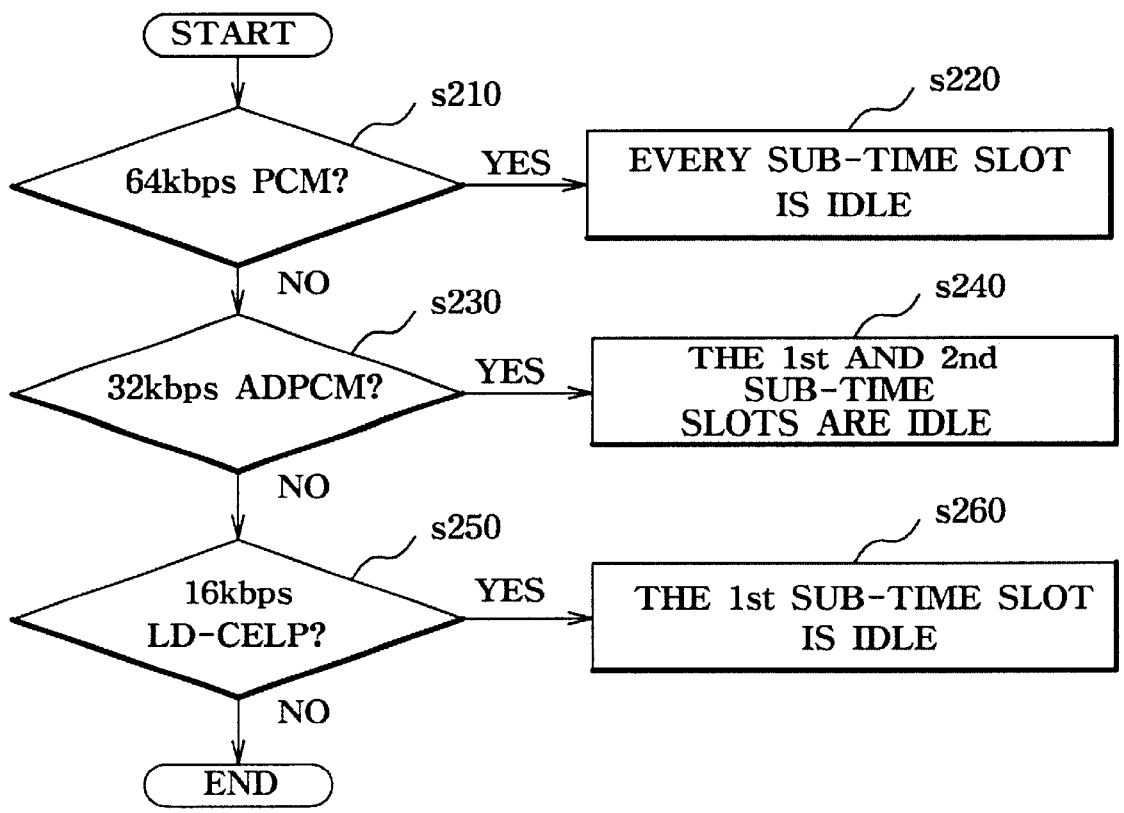
FIG. 3 is a flow chart of a method for assigning sub-time slot of the present invention.

FIG. 3 illustrates a flow chart showing the steps involved in reserving one or more sub-time slot for data transmission in accordance with the present invention. In step (s210), in the event that the data transmission rate is determined to be 64 kbps PCM, in step(s220), the RDU (40) stores a value of SUBT_MASK in binary notation, Oxff(11111111) in a parameter, in order to reserve every sub-time slots into idle state. The value of SUB_MASK is a variable for setting the sub-time slot of time slots into idle state for actual communication link.

In step (s230), in the event that the data transmission rate is determined to be 32 kbps ADPCM, the RDU stores a value of SUB_MASK in binary notation, Oxf0(11110000), for reserving the first and the second sub-time slots into idle state, in step (s240).

In step (s250), in the event that the data transmission rate is determined to be 16 kbps LD-CELP, the RDU stores a value of SUB_MASK in binary notation, OxcO(11000000), for reserving only the first sub-time slot in idle state, in step(s260), The present invention incorporates two types of parameters. The above stated SUBTS-MASK parameter is used for assigning the sub-time slot for actual data communication. The other parameter is used to indicate the status of each trunk/time slot/sub-time slot, which indicates whether each sub-time slot is in idle state or not. For an example, if a parameter of 2/1/3 is assigned, it means that the third sub-time slot of the first time slot of the second link is in busy state. Thus, in order to set up all the sub-time slots into a busy state, the corresponding parameter of 2/1/x is increased from 2/1/1 to 2/1/4, one by one, to set up the idle state into a busy state.

Accordingly, after setting up the appropriate sub-time slot in idle state responsive to the call request, in step (s160), the RDU sets up the remaining sub-time slots that are not reserved in steps (s220, s240, and 260) into a busy state for preventing other subscribers from occupying these remaining sub-time slots. These remaining sub-time slots are changed into a busy state by increasing the number representing the sub-time slots of the first time slot in the parameter from 1 up to the maximum value, one by one, and thus assigning the status of each sub-time slot into a busy state.

After setting every sub-time slots in the first time slot of the trunk into a busy state, the remaining time slots and all of their sub-time slots are also set into a busy state. These remaining time slots of the assigned trunk are changed into a busy state by increasing the time slot number in the corresponding parameter from 1 up to the maximum value, one by one, and then repeatedly assigning the status of every sub-time slot in each of the remaining time slots into a busy state.

Accordingly, the RDU is able to use only the necessary sub-time slots that are required depending on various data transmission rate through two types of parameters, and thus, prevents the unused sub-time slots from being used for other purposes. Accordingly, the RDU transmits and receives data through the sub-time slots reserved according to the rate of data transmission having high compression rate (i.e., ADPCM or LD-CELP).

In step (s170), the RDU stores the assignment result for each sub-time slots reserved/set up in step (s150) and step (s160). Thus, based on the assignment results, the RDU can recover correct data at correct data rate using the SUBTS_MASK parameter.

After the completion of data transmission through the reserved sub-time slots, the BTS or BSC of the system requests a release of resource allocation, then the RDU respond by simply assigning all sub-time slots that were set up as busy state back into idle state.

Figure 4:
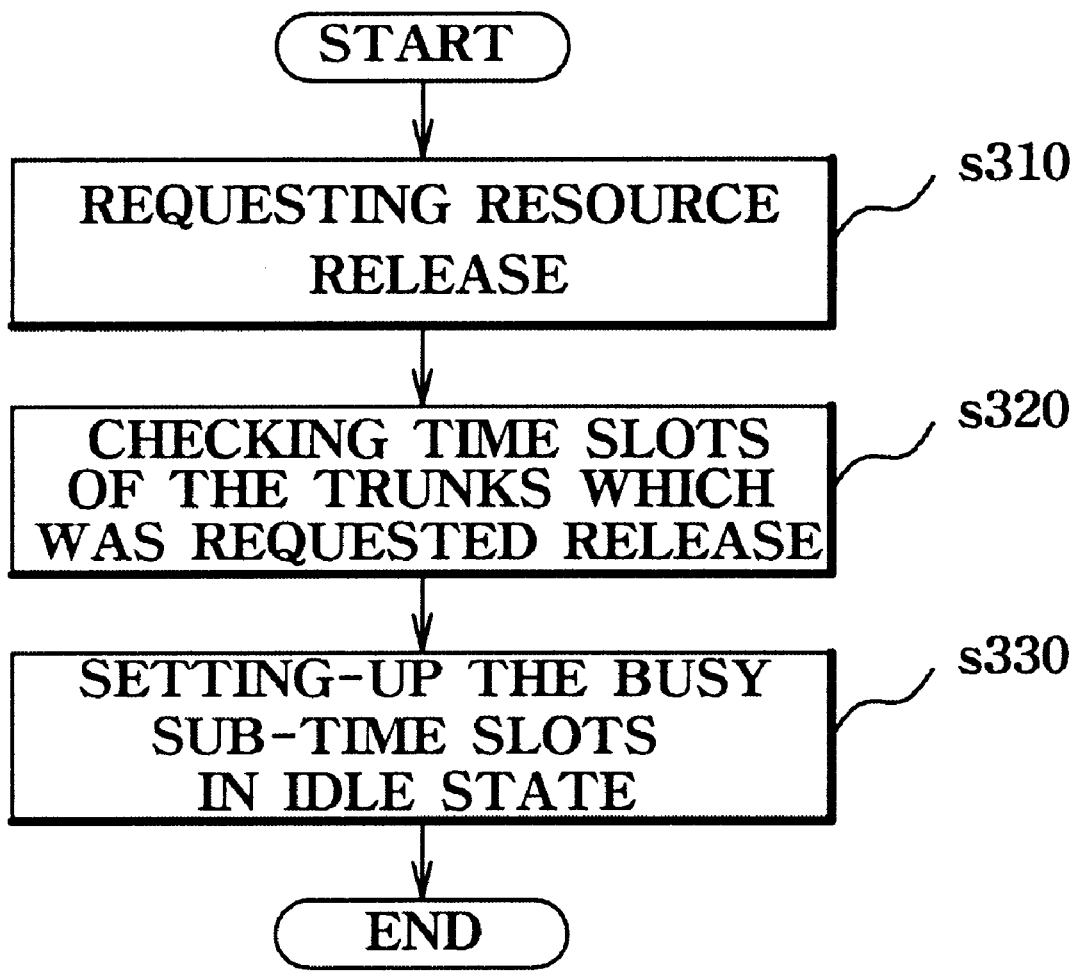
FIG. 4 is a flow chart of a resource release method of the RDU of the present invention.

FIG. 4 is a flow chart illustrating the release process of the RDU according to the present invention. In step (s310), if a request to release a particular resource allocation is requested, the RDU checks for the status of trunk by determining the sub-time slots to which the release request is addressed, in step (s320). In step (s330), the RDU converts the sub-time slot into an idle state, which was previously set up as busy state in step s160 of FIG. 2 so that the sub-time slot can handle the next data transmission.

A preferable embodiment of a method for assigning communication resources according to the present invention includes a radio distribution unit (RDU) connecting a plurality of radio carrier station (RCSs), and a local exchange (LE) through a plurality of trunks having a plurality of time slots, the method comprising the steps of:

requesting a call for data service to the RDU and transmitting information of the trunk to which the call request is addressed by the RCS and the LE;

confirming by the RDU whether the sub-time slots of the first time slot of the trunk and the first time slot are in idle state;

in case the first sub-time slot in the first time slot of the assigned trunk and the first time slot are in idle state, determining the data transmission rate/type of the requested call;

assigning a value to SUBTS_MASK, the SUBTS_MASK being a variable for setting the sub-time slot in each time slot of the trunk for data transmission in response to the determined data transmission rate;

after assigning the value of the SUBTS_MASK, setting remainder sub-time slots in the first time slot of the trunk that are not set to idle state into busy state;

after setting the remainder sub-time slots of the first time slot into a busy state, setting all the sub-time slots in the remaining time slots other than the first time slot of the trunks; and storing the set up results for all sub-time slots in the look up table.

It is preferable in the embodiment that in case the first time slot and the first sub-time slot are not in idle state, the method according to the present invention further comprises a step of outputting an error message indicating that resource allocation has failed.

It is preferable that wherein the requested data transmission rate for the call request includes 64 kbps PCM data transmission, 32 kbps ADPCM data transmission, and 16 kbps LD-CELP data transmission.

It is preferable that each time slot is composed of 8 bits.

It is preferable that each sub-time slot is composed of 2 bits.

It is preferable that in event that the data transmission rate for the requested call is determined to be 64 kbps PCM data transmission, the value of SUBTS_MASK is set to be Oxff(11111111) in a first parameter to use every sub-time slots in the relevant time slot of the trunk to which call requested is addressed.

It is preferable that in event that the data transmission rate for the requested call is determined to be 64 kbps PCM data transmission, the value of SUBTS_MASK is set to be Oxf0(11110000) in a first parameter to use the two slots in the relevant time slot of the trunk to which call requested is addressed.

It is preferable that in event that the data transmission rate for the requested call is determined to be 64 kbps PCM data transmission, the value of SUBTS_MASK is set to be Oxc0(11000000) in a first parameter to use only one sub-time slot in the relevant time slot of the trunk to which call requested is addressed.

It is preferable that in the event that a BTS or BSC requests a resource release, the method further comprises the steps of:

checking the status of sub-time slots of the time slots that were previously set as busy state through the assigned SUBTS_MASK value in 2 bit unit, and if the determined sub-time slots are assigned as busy state, setting the busy sub-time slots into an idle state.

It is preferable that in setting the remainder sub-time slots of the first time slot into busy state further includes the steps of:

increasing the number representing the sub-time slots of the first time slot in a second parameter from 1 up to a maximum value one by one, assigning the status of each sub-time slot into a busy state.

It is preferable that in setting the remainder time slots of the trunk into busy state further includes the steps of:

increasing the number representing the remainder time slots in a second parameter from 1 up to a maximum value one by one; and repeatedly assigning the status of every sub-time slots in the remaining time slots into busy state.

As like previous description of the present invention, the advantage of a representative embodiment of the invention is as follows. The present invention makes the resource/channel allocation based on the various data transmission rate, i.e. 64 kbps PCM, 32 kbps ADPCM, and 16 kbps LD-CELP. In the prior art, it was impossible to know which sub-time slot is being used for at which data transfer rate. For an example, an error occurred in trying to received data using 32 kbps ADPCM when 64 kbps PCM was used to transfer data. In the present invention, the recovery error is improved by using SUBTS_MASK parameter, by indicating which sub-time slot is being used for a data transfer at a specified data rate. As a result, the WLL system according to the present invention can render various data services, increase the capacity of trunks, and provide service to more subscribers.

What is claimed is:

1. A method for setting communication resources according to different data transmission rates in the wireless local loop (WLL) system of the type having a radio distribution unit (RDU) coupled to a plurality of radio carrier stations (RCSs) and a local exchange (LE) through a plurality of trunks having a plurality of time slots, said method comprising the steps of:

(a) receiving, at said radio distribution unit, a call request, from said radio carrier stations and said local exchange, to establish communication resources in said time slots of said trunks and receiving information about available communication resources from a pre-stored look up table to which said call request is addressed;

(b) checking said received information for whether the sub-time slots of said time slot for said call request are in idle state by said radio distribution unit;

(c) determining a data transmission rate of said call request, if the sub-time slots of said time slot are in idle state, (d) reserving the sub-time slots of said time slot for said call request in idle state for data transmission according to said determined data transmission rate;

(e) setting other remaining sub-time slots of said time slot that are not reserved in step (d) into a busy state in order to prevent other call requests thereon;

(f) setting other remaining time-slots of said trunk, to which said call request is not addressed, into a busy state; and, (g) storing the results of step (d) and (e) in said look up table.

2. A method as set forth in claim 1, wherein if said step (b) is determined to be not in idle state, said method further comprises a step of outputting an error message.

3. A method as set forth in claim 1, wherein said data transmission rates includes 64 kbps PCM, 32 kbps ADPCM, and 16 kbps LD-CELP.

4. A method as set forth in claim 3, wherein said time slot is composed of 8 bits.

5. A method as set forth in claim 4, wherein said sub-time slot is composed of 2 bits.

6. A method as set forth in claim 5, wherein said step (c) comprises reserving every sub-time slots in said time slot of said trunk in idle state for data transmission, by assigning a binary notation of Oxff(11111111) in a parameter when said data transmission rate is determined to be 64 kbps PCM.

7. A method as set forth in claim 5, wherein said step (c) comprises reserving two sub-time slots in said time slot of said trunk in idle state for data transmission, by assigning a binary notation of Oxf0(11110000) in a parameter when said data transmission rate is determined to be 32 kbps ADPCM.

8. A method as set forth in claim 5, wherein said step (c) comprises reserving one sub-time slot in said time slot of said trunk in idle state for data transmission, by assigning a binary notation of Oxco(11000000) in a parameter when said data transmission rate is determined to be 16 kbps LD-CELP.

9. A method as set forth in any one of claim 5, wherein in event that a resource release is requested from a base station, the method further comprises the steps of:

receiving, at said radio distribution unit, said release request after data transmission, from said base station, to release communication resources in said time slot of said trunk;

checking for busy state in the sub-time slots of said time slot to which said release request is addressed; and, converting the sub-time slots of said time slot in busy state into an idle state.

10. A method as set forth in claim 1, wherein said step (e) comprises the step of:

increasing a number representing the sub-time slots of said time slot in a parameter from 1 up to a maximum value one by one, and assigning the status of each sub-time slot in said time slot into a busy state.

11. A method as set forth in claim 1, wherein said step (f) comprises the steps of:

increasing a number representing the time slot number in said assigned trunk from 1 up to a maximum value one by one, and repeatedly assigning the status of every sub-time slot in said each time slot into a busy state.

12. A method for setting communication resources according to different data transmission rates in the wireless local loop (WLL) system of the type having a radio distribution unit (RDU) coupled to a plurality of radio carrier stations (RCSs) and a local exchange (LE) through a plurality of trunks having a plurality of time slots, said method comprising the steps of:

(a) receiving, at said radio distribution unit, a call request, from said radio carrier stations and said local exchange, to establish communication resources in said time slots of said trunks and receiving information about available communication resources from a pre-stored look up table to which said call request is addressed;

(b) checking said received information for whether the sub-time slots of said time slot for said call request are in idle state by said radio distribution unit;

(c) determining a data transmission of said call request, if the sub-time slots of said time slot are in idle state, (d) reserving the sub-time slots of said time slot for said call request in idle state for data transmission according to said determined data transmission rate;

(e) setting other remaining sub-time slots of said time slot that are not reserved in step (d) into a busy state in order to prevent other call requests thereon;

(f) setting other remaining time-slots of said trunk, to which said call request is not addressed, into a busy state;

(g) storing the results of step (d) and (e) in said look up table;

(h) receiving, at said radio distribution unit, a release request after data transmission, from a base station, to release communication resources in said time slot of said trunk;

(i) checking for busy state in the sub-time slots of said time slot to which said release request is addressed; and, (j) converting the sub-time slots of said time slot that are set into a busy state in said step (e) and step (f) back into an idle state.

13. A method as set forth in claim 12, wherein if said step (b) is determined to be not in idle state, said method further comprises a step of outputting an error message.

14. A method as set forth in claim 12, wherein said data transmission rates includes 64 kbps PCM, 32 kbps ADPCM, and 16 kbps LD-CELP.

15. A method as set forth in claim 14, wherein said time slot is composed of 8 bits and said sub-time slot is composed of 2 bits.

16. A method as set forth in claim 12, wherein said step (c) comprises reserving every sub-time slots in said time slot of said trunk in idle state for data transmission, by assigning a binary notation of 0xff(11111111) in a parameter when said data transmission rate is determined to be 64 kbps PCM.

17. A method as set forth in claim 12, wherein said step (c) comprises reserving two sub-time slots in said time slot of said trunk in idle state for data transmission, by assigning a binary notation of 0xf0(11110000) in a parameter when said data transmission rate is determined to be 32 kbps ADPCM.

18. A method as set forth in claim 12, wherein said step (c) comprises reserving one sub-time slot in said time slot of said trunk in idle state for data transmission, by assigning a binary notation of 0xco(11000000) in a parameter when said data transmission rate is determined to be 16 kbps LD-CELP.

19. A method as set forth in claim 12, wherein said step (e) comprises the step of:

increasing a number representing the sub-time slots of said time slot in a parameter from 1 up to a maximum value one by one, and assigning the status of each sub-time slot in said time slot into a busy state.

20. A method as set forth in claim 12, wherein said step (f) comprises the steps of:

increasing a number representing the time slot number in said assigned trunk from 1 up to a maximum value one by one, and repeatedly assigning the status of every sub-time slot in said each time slot into a busy state.

\* \* \* \* \*